United States Patent [19]

Jackson et al.

[11] 4,164,594
[45] Aug. 14, 1979

[54] LECITHIN BASED WETTING AGENT

[75] Inventors: William P. Jackson, Chatsworth, Calif.; Michael R. Warseck, Fairport, N.Y.

[73] Assignee: Carnation Company, Los Angeles, Calif.

[21] Appl. No.: 800,243

[22] Filed: May 25, 1977

[51] Int. Cl.² ............................. A23J 7/02; A23C 9/16
[52] U.S. Cl. ..................................... 426/662; 426/580; 426/588; 426/606; 426/612
[58] Field of Search ............... 426/601, 606, 607, 580, 426/588, 662, 611, 612

[56] References Cited

U.S. PATENT DOCUMENTS

| | | | |
|---|---|---|---|
| 2,050,528 | 8/1936 | Grettie | 426/612 |
| 2,483,748 | 10/1949 | Wittcoff | 426/606 X |
| 2,494,771 | 1/1950 | Markley | 426/662 X |
| 3,480,544 | 11/1969 | Hilty | 426/662 X |
| 3,528,823 | 9/1970 | Rossen | 426/606 |
| 3,563,766 | 2/1971 | Matsui et al. | 426/606 |
| 3,943,259 | 3/1976 | Norris | 426/606 X |

OTHER PUBLICATIONS

Encyclopedia of Chemical Technology, Kirk and Othmer, vol. 12, pp. 350–352.

*Primary Examiner*—David M. Naff
*Attorney, Agent, or Firm*—Eugene C. Ziehm; Robert D. Kummel

[57] ABSTRACT

An improved wetting agent for use in the production of fat-containing powdered products which are spontaneously wettable and dispersible in cold aqueous liquids. The wetting agent comprises oil-free granular phosphatides containing at least 95% acetone insoluble matter dissolved in an oil which has a bland taste, a maximum iodine value of 2.0 and which is a liquid at temperatures as low as about 0° C.

5 Claims, No Drawings

LECITHIN BASED WETTING AGENT

BACKGROUND OF THE INVENTION

This invention relates to an improved wetting agent and its use in the production of edible fat-containing powdered products. More particularly, the invention relates to fat-containing powders that are readily wettable and dispersible in cold aqueous liquids to form reconstituted edible beverages.

Non-fat dry milk products which are readily and completely dispersed in water with little or no agitation to form reconstituted milk have been available for a number of years. Such products are generally made by a process in which spray dried particles of non-fat milk are agglomerated to form porous aggregates, and are commonly referred to as being instantized. Such porous aggregates have high wettability whereby when a quantity of the powder is deposited upon the surface of cold water, the powder mass wets and sinks within a short interval, and disperses upon stirring with a spoon, without the formation of sticky lumps. However, when known methods for the production of instantized non-fat milk are used in the production of products having a substantial fat content, such as whole milk, the resulting product, although in the form of porous aggregates, does not have the desired instant properties. Such dry fat-containing milk products have poor wettability and dispersability in cold water so that the powder tends to float on the surface of water and form sticky lumps upon stirring.

Numerous attempts have been made to improve the wettability and dispersability of such fat-containing milk powders, including the use of wetting agents. Thus, the use of lecithin as a wetting agent to improve the wetting property of fat-containing milk products has been disclosed in the prior art. U.S. Pat. No. 3,120,438 discloses contacting fat-containing milk powder with commercial lecithin by itself or in a corn oil carrier, either by dry blending the ingredients or by spraying lecithin on the milk particles, after which the milk particles are instantized to form porous aggregates. U.S. Pat. No. 3,810,765 discloses adsorbing commercial lecithin on a water soluble sugar and mixing the lecithin-sugar mixture with a fat-containing milk powder. U.S. Pat. No. 3,300,315 discloses the production of instantized fat-containing milk products by subjecting spray dried milk particles to an atmosphere of wet steam having liquid lecithin finely dispersed therein to thereby form porous aggregates having lecithin incorporated thereon. U.S. Pat. No. 3,164,473 discloses the incorporation of liquid lecithin in whole milk powder in a particular manner in order to improve the wettability of the product. For example, anhydrous spray-dried milk powder is passed through a hydrating chamber where it is moistened with water containing lecithin and the moist particles formed into porous aggregates. U.S. Pat. No. 3,291,614 discloses contacting dry fat-containing milk products with lecithin under conditions which distribute the lecithin over the surface of the particles so that all of the fat adjacent the particle surfaces is covered with the lecithin. The lecithin may be applied either as a water emulsion or in a volatile organic solvent such as hexane.

While such prior art procedures purport to improve the wettability and dispersability of fat-containing milk products, they suffer from one or more disadvantages which adversely affect their use in the production of commercial products. For example, reported improvements with respect to wettability and dispersability are usually relative and in few, if any, of the prior art procedures is the final product spontaneously wettable, particularly when reconstituted with cold water. Also, in the prior art procedures, the use of organic solvents or common vegetable oil carriers for the lecithin and/or impurities in the lecithin tends to impart undesirable off-flavors to the product.

SUMMARY OF THE INVENTION

The present invention provides an improved lecithin-based wetting agent which, when used in the production of dry fat-containing products, provides products which are spontaneously wettable in aqueous liquids even in ice water. The wetting agent of this invention comprises oil free, granular phosphatides containing at least 95% acetone insoluble matter dissolved in an oil carrier which has a bland taste, a maximum iodine value of 2.0 and which is a liquid at temperatures as low as about 0° C. Such vegetable oil carriers which may be used are glyceryl esters of capric acid and caprylic acid and mixtures thereof. The oil-free phosphatide is combined with the carrier in an amount sufficient to provide the wetting agent with a level of acetone insoluble matter in the range of from about 25% to 65%. If desired, an antioxidant may also be included in the wetting agent.

The wetting agent of this invention may be applied to the fat-containing powder by conventional techniques such as spraying the wetting agent as an aerosol onto the powder, dry blending the wetting agent with the powder and the like.

The resulting product, which has a phosphatide content of from about 0.5% to 0.35% by weight, will wet and disperse in 6° C. water in less than 10 seconds and will remain stable with respect to wetting for at least one year at room temperature. The wetting agent imparts no adverse taste or flavor to the reconstituted beverage.

DETAILED DESCRIPTION OF THE INVENTION

Lecithin is a phosphorous-containing lipid, that is, a phosphatide, which consists of glycerol combined with two fatty acid radicals, phosphoric acid and choline. The lecithin of commerce is predominantly soybean lecithin, with relatively small quantities of lecithin being derived from corn, peanut, rapeseed and egg yolk or other animal sources. Commercial soybean lecithin, which is usually simply called "lecithin" or "commercial lecithin" is the phosphatide residue obtained in the manufacture of soybean oil. Thus, in commercial practice the terms "lecithin" and "commercial lecithin" refers to a mixture of acetone-insoluble phosphatides together with other substances such as carbohydrates, glyceride oils, fatty acids, and sterols that occur with the phosphatides. Such "lecithin" or "commercial lecithin" contains about two-thirds phosphatides or acetone-insoluble matter, and one-third matter which is soluble in acetone, such as the glyceride oil, fatty acids, etc., and is a viscous semiliquid with a characteristic odor.

The wetting agent of the present invention utilizes, as one component, granular lecithin which is substantially oil-free and which contains 95% or more acetone-insoluble matter or phosphatides. Such oil-free lecithin may be produced by contacting commercial lecithin, such as obtained by the solvent extraction of soybeans, with acetone to remove the glyceride oils, fatty acids, sterols, traces of bitter principles, etc. from the phosphatides. The acetone-washed phosphatides are then freed from residual acetone by agitation and distillation under vacuum. The oil-free phosphatides have a very bland flavor and are free from the undesirable off flavors inherent in commercial lecithin. Such granular oil-free phosphatides are available commercially, such as granular lecithin sold under the tradename Centrolex R by the Central Soya Company.

The wetting agent of the present invention is provided by dissolving the granular, oil-free phosphatides in a particular oil carrier. Although the oil functions only as a carrier for the phosphatides, its selection can greatly affect the functionality, stability and flavor of the wetting agent and the product to which it is added. For example, the oil carrier must have a bland flavor and have good stability against oxidation so that the development of rancidity and off-flavors is avoided. Also fats and oils having a relatively high melting point, when used as carriers, tend to solidify after application of the wetting agent and form a matrix which binds up the wetting agent making it unavailable for wetting. This is of particular concern when the wetting agent is used on fat-containing powders which are to be reconstituted with a cold aqueous liquid.

Thus, an important component of the wetting agent of the present invention is an oil carrier which remains liquid at low temperatures, that is, temperatures as low as about 0° C., has a maximum iodine value of about 2.0, and has a bland flavor. It has been found that oils having very low unsaturation and a high content of short chain acids have this desired combination of properties. Such oils include glyceryl esters of capric acid and caprylic acid and mixtures thereof. Such oils may be obtained by the fractional distillation of vegetable oils which have a relatively large content of capric acid and caprylic acid, such as coconut oil (about 7.9% caprylic acid and 7.2% capric acid), palm kernel oil (about 6% caprylic acid and 4% capric acid), palm oil (about 9.8% caprylic acid and 8.2% capric acid), babassu oil (about 4.8% caprylic acid and 6.6% capric acid), cohune oil (about 7.5% caprylic acid and 6.6% capric acid) and the like. A preferred oil for use as the carrier in the wetting agent of the present invention is a mixture of 70% glyceryl esters of capric acid and 30% glyceryl esters of caprylic acid, sold by Pacific Vegetable Oil Company under the designation PVO 1400. This oil has a very bland flavor and a settling point below minus 5° C., so that the oil remains a liquid at reconstitution temperatures as low as 0° C. and does not interfere with the wetting function of the phosphatides at such low temperatures. Also, PVO 1400 oil has a maximum iodine value of 2.0 so that it is highly stable against oxidation, and has a very low viscosity which enables the oil to form a very fine aerosol and evenly distributed over a fat-containing powder. Moreover, PVO 1400 oil exhibits a defoaming capacity in reconstituted products.

The wetting agent of this invention is prepared by dissolving the oil-free phosphatides in the oil carrier in an amount sufficient to provide the wetting agent with an acetoneinsoluble phosphatide content of from 25% to 65%, preferably from about 30% to 40% phosphatide. Within these ranges, the wetting agent has a very bland flavor and provides good wetting even at temperatures as low as 0° C. At a phosphatide level above about 65%, good wetting is obtained but flavor problems are encountered, while at a phosphatide level below about 25% flavor is acceptable but wetting ability is impaired.

The wetting agent may, if desired, also contain a minor amount of an antioxidant to retard oxidation of the phosphatides and/or the fat in the fat-containing powder. A wide variety of food-approved, food grade antioxidants may be used, such as one or more of the following: butylated hydroxyanisole (BHA), butylated hydroxytolvene (BHT), propyl gallate, and citric acid. A solvent for the antioxidant, such as propylene glycol, may be used if desired. A preferred anitoxidant is one supplied by Eastman Chemical Products, Inc. under the trademark Tenox A, which contains 52% propylene glycol, 40% BHA and 8% citric acid. The antioxidant may be present in the wetting agent in an amount ranging from 0% to about 5% by weight, with a level of 0.1% by weight being preferred.

The wetting agent of the present invention may be used in the production of a wide variety of fat-containing powdered products which are intended to be reconstituted with an aqueous liquid to form an edible beverage. Generally such powdered products comprise a fat and water soluble milk components such as, for example, casein, whey and sugars such as lactose, sucrose, etc. The fat may be butterfat or any one of a number of fully or partially hydrogenated vegetable oils, such as coconut oil, cottonseed oil, peanut oil, corn oil and the like. The fat should have a melting point on the order of about 90° F. to 110° F. Thus, the fat-containing powdered product may comprise dried whole milk, dried low fat milk, dried milk low fat milk mixtures, dried cream, malted milk, dried ice cream mixes, dried filled milk ingredients, dry ersatz milk ingredients, chocolate or cocoa containing powders, and related type products. Such fat-containing powders may have a fat content ranging from about 5% to 50% or more and have a particle size on the range of from 50 to 100 microns. The use of the wetting agent of this invention with any such fat-containing powdered products provides a product characterized by a high degree of wettability and dispersibility in cold water, with no off-flavors.

Any of a number of procedures may be used for applying the wetting agent to the fat-containing powder. One procedure is to spray the wetting agent as an aerosol onto the dry powder or powder blend at any convenient point prior to instantizing. In this procedure the wetting agent may be at a temperature in the range of from about 70° F. to 180° F. Temperatures in excess of 180° F. should be avoided since it may result in color or flavor changes or loss of functionality of the wetting agent. Generally it is preferred that the wetting agent be at a temperature of between 120° F.-140° F. when sprayed on the powder, for at such temperatures a finer aerosol may be obtained which results in better dispersion of the wetting agent on the powder. After spraying the wetting agent onto the powder, the powder is blended to thoroughly disperse the wetting agent so that all or substantially all of the powder particles are coated with a thin layer of the wetting agent.

Another method is to apply the wetting agent to the powder by mechanical blending. Such an application requires a high rate of shear and mixing such as in a "V" type blender with a breaker bar operating. Regardless of how the wetting agent is applied to the powder, the amount of wetting agent applied should be sufficient to provide the powdered product with a phosphatide content of from about 0.05% to 0.35% by weight.

After application of the wetting agent, the fat-containing powder may be instantized by any of the well-known procedures for forming porous agglomerates such as disclosed in U.S. Pat. No. 2,835,586 to D. D. Peebles. The resulting porous agglomerates are then dried to a moisture content of from about 1.5%–3.5%.

The following examples are intended to illustrate the present invention.

EXAMPLE 1

A wetting agent of the present invention is prepared by dissolving 36.8% by weight granular, oil-free lecithin which contains 95% acetone insoluble whole phosphatides into 63.1% by weight of an oil consisting of 70% glyceryl esters of capric acid and 30% glyceryl esters of caprylic acid, and 0.1% by weight of an antioxidant which consists of 52% propylene glycol, 40% butylated hydroxyanisole and 8% citric acid. In preparing the wetting agent, the antioxidant and oil are combined and heated to a temperature of about 140° F. and the granular oil-free lecithin added with stirring until dissolved. The wetting agent thus formed contains 35% acetone insoluble matter and is free from foreign or off odors and flavors. It is liquid at room temperatures and has a maximum Brookfield viscosity of 100 CP at 25° C. (No. 4 spindle).

EXAMPLE 2

An instant, low butterfat milk is prepared by adding about 1.9 lbs. of powdered lactose, and 0.008 lbs. of a dry blend of Vitamin A and D to 97.9 lbs. of dry, low fat milk powder which has a butterfat content of about 5% (dry basis), a moisture content of about 3.5% and a particle size such that 1% is +12 mesh and 10% is −200 mesh (U.S. Standard Sieve). The dry ingredients are blended for 3–5 minutes. About 0.2 lbs. of the wetting agent of Example 1 is heated to a temperature of 130°–140° F. and sprayed, at that temperature, onto the dry ingredients mix. After spraying, the mix is blended in a ribbon blender for 15–30 minutes to insure thorough distribution of the phosphatides. The resulting mix, which has a moisture content of 2.5%–3.5%, is then subjected to an instantizing step wherein the individual particles of the dry mix are moistened and bonded together to form porous agglomerates which are subsequently dried to a moisture content of 1.5%–3.5%. The resulting product will wet and disperse in 6° C. water in less than 10 seconds, and has no off flavors or odors.

While the invention has been described and illustrated with reference to a particular preferred embodiment, it is to be understood that this is only illustrative and not intended to limit the scope of the invention. Rather, the invention encompasses modifications and variations which fall within the scope of the appended claims.

What is claimed is:

1. A wetting agent which consists essentially of lecithin containing at least 95% acetone insoluble lecithin in an oil carrier having a maximum iodine value of 2.0, a bland taste and which is a liquid at temperatures ranging from room temperature to 0° C., the wetting agent containing from about 25% to 65% acetone insoluble lecithin.

2. The wetting agent defined in claim 1 in which the oil consists essentially of glyceryl esters of capric acid, caprylic acid and mixtures thereof.

3. The wetting agent defined in claim 2 in which the oil consists essentially of 70% by weight of glyceryl esters of capric acid and 30% by weight of glyceryl esters of caprylic acid.

4. The wetting agent defined in claim 1 in which the wetting agent contains up to about 5% by weight of an antioxidant.

5. The wetting agent defined in claim 3 in which the oil has a settling point below minus 5° C.

* * * * *